United States Patent Office 3,362,813
Patented Jan. 9, 1968

3,362,813
AUSTENITIC STAINLESS STEEL ALLOY
Walter C. Ziolkowski, Douglassville, Pa., assignor to The Carpenter Steel Company, Reading, Pa.
No Drawing. Filed Sept. 15, 1964, Ser. No. 396,717
10 Claims. (Cl. 75—128)

This invention relates to an austenitic stainless steel alloy and more particularly to such an alloy which has an improved absorption cross-section for thermal neutrons.

It is known that such elements as gadolinium, europium, samarium and dysprosium, because of their relatively high absorption cross-section for thermal neutrons, are desirable additions to alloys from which such parts as nuclear reactor control rods are to be made. Boron (in its radioactive form, B10) is another element which has a relatively high absorption cross-section and some success has been achieved in forming such parts as nuclear reactor control rods of boron-containing alloys. However, the high cost of boron and the difficulty usually encountered in working with it leaves much to be desired.

Hitherto, efforts have been made to provide such parts as reactor control rods containing gadolinium by means of powder metallurgy techniques because of the extremely high absorption cros-section of gadolinium. While I succeeded in casting fully austenitic stainless steel ingots containing gadolinium, I found that they could not be successfully hot worked.

I have discovered, quite unexpectedly, that stainless steel alloys containing appreciable amounts of an element such as gadolinium may be successfully hot worked in commercial quantities when the alloy is so balanced as to contain from about 5% to 25% ferrite. My alloy has an improved absorption cross-section for thermal neutrons and may be readily hot worked and provided in a wide variety of wrought forms.

The unexpected nature of my discovery may be better appreciated when it is understood that normally fully austenitic stainless steel alloys may be hot worked. However, when such an alloy contains as little as about 5% ferrite, the hot workability of the alloy is markedly reduced. Furthermore, when such an alloy contains as much as 10% ferrite it becomes so difficult to hot work that it no longer can be made available to any practical extent in wrought form on a commercial scale. Thus, contrary to the usual practice, my alloy is rendered hot workable by purposely adjusting the balance of the alloying elements so that when the alloy is cast as an ingot it contains from about 5% to 25% ferrite.

Stainless steel alloys containing gadolinium are most preferred for use in making such parts as nuclear reactor control rods because of the favorable absorption cross-section to thermal neutrons afforded by the gadolinium content. However, europium, samarium and dysprosium may be used either alone or together with gadolinium up to a combined total content of about 3%.

It is therefore a principal object of the present invention to provide an essentially austenitic stainless steel alloy containing one or more of the elements gadolinium, europium, samarium and dysprosium which may be readily hot worked.

The alloy of the present invention is particularly well suited for use in providing wrought products which may be used where parts having a high thermal neutron absorption cross-section are required. It is therefore a further object of the present invention to provide essentially austenitic stainless steel wrought articles containing substantial amounts of one or more of the elements gadolinium, europium, samarium and dysprosium.

I have discovered that the foregoing objects can be achieved with an essentially austenitic stainless steel alloy, that is such an alloy containing from about 5% to 25% ferrite in its as-cast form, and having the following analysis in percent by weight within the tolerances of good commercial melting practices:

|  | Percent |
|---|---|
| Carbon | up to .25 |
| Manganese | up to 10 |
| Silicon | up to 2 |
| Phosphorus } Sulfur } Selenium | up to 1 |
| Chromium | 12 to 26 |
| Nickel | 3.5 to 22 |
| Molybdenum | up to 4 |
| Copper | up to 4 |
| Aluminum | up to 4 |
| Titanium | up to 1.25 |
| Columbium | up to 1.25 |
| Nitrogen | up to .7 |
| Gadolinium | .20 to 3 | the balance iron except for incidental impurities.

The proper balance of the alloying elements in my alloy is highly critical and must be carefully maintained so as to provide a minimum of about 5% ferrite and no more than about 25% ferrite in the as-cast ingot. Unless this critical balance is maintained the alloy is not hot workable on a commercial scale.

In this alloy, up to about .25% carbon may be present for additional high temperature strength. However, when not needed for this purpose, carbon is present in no more than residual amounts or up to a maximum of about .03% in order to provide better corrosion resistance properties.

Manganese and silicon each may be present in my alloy up to about 2% in accordance with good melting practice as deoxidizers although for this purpose I preferably limit the retained amount of manganese and silicon each to no more than 1%. When, as is preferred, the alloy is prepared by utilizing vacuum melting techniques, little or none of either manganese or silicon is necessary for this purpose and they are each preferably present, if at all, only as an incidental impurity. As will be pointed out more fully hereinbelow, larger amounts of manganese may be used for other purposes.

Because of their adverse effect on the corrosion resistance and hot workability of my alloy, it preferably contains no more than about .045% phosphorus and .030% sulfur. For best corrosion resistance and hot workability I limit phosphorus and sulfur each to no more than .010%. However, phosphorus, sulfur and also selenium have a beneficial effect on the machinability of the alloy and when necessary for this purpose I may use a total of up to about 1% of one or more of the elements sulfur, phosphorus and selenium when the reduction in hot workability caused by their presence may be tolerated.

Chromium and nickel mainly provide the stainless properties of my alloy and for this purpose usually at least about 12% chromium and 6% nickel are required. Chromium may be present in amounts above about 26% but additional nickel would then be required to provide the desired predominately austenitic balance in the alloy. While nickel in amounts greater than 22% may be utilized if the required ferrite content is not adversely affected, I preferably do not use more than about 22% nickel. Furthermore, nickel in amounts of about 50% or more is not desired in parts used in nuclear reactors because of the objectionable radioisotopes that may be formed. Consistently good results are attained with about 17% to 19% chromium and about 7% to 12% nickel particularly because of the ease with which the preferred 10% to 15% ferrite can be provided in the as-cast ingot.

When desired for enhanced corrosion resistance up to about 4% aluminum may be included in my alloy as a separate addition or to replace up to about 8% of the chromium above the minimum of about 12% chromium. In this connection, aluminum may be used to replace chromium in the ratio of about 1 to 2.

Manganese may be used instead of part of the nickel to form austenite in my alloy and for this purpose up to about 10% manganese may be used in the ratio of about 1.5%–2% manganese to 1% nickel as a substitute for the part of the nickel in excess of about 3.5%. This is particularly advantageous where it is desired to improve the room temperature strength of the alloy and to reduce its cost.

Copper in amounts of up to about 4% may also be added to provide enhanced corrosion resistance. Above about 5% nickel, copper on a 1 for 1 basis may be used to replace nickel for this purpose, the larger amounts of copper being used with the larger amounts of nickel.

Nitrogen has a beneficial strengthening effect. However, because it is a powerful austenite former, care must be exercised in using nitrogen as in the case of the other austenitizing elements, so as to avoid an adverse effect upon the required ferrite content of the alloy. Thus, while preserving the required balance of the alloy, as much nitrogen may be utilized as will not interfere with the soundness of the steel, that is usually up to about .7%. Because nitrogen is such a powerful austenite former, it may be used in the ratio of 30 to 1 to replace part of the nickel in excess of about 5%, in the ratio of 60 to 1 to replace manganese, or on a 1 to 1 basis to replace carbon.

When desired, titanium and/or columbium may be included in my alloy. From about five times the carbon content and up to about 1.25% titanium may be beneficially used to stabilize the alloy against chromium carbide precipitation in the grain boundaries. For this same effect, from about ten times the carbon content up to about 1.25% columbium may be used. Tantalum usually is present with columbium and by columbium it is intended here and elsewhere in this application to refer to the combined amount of columbium and tantalum that is present in the alloy.

Because of its highly favorable absorption cross-section for thermal neutrons, as little as .2% gadolinium has a beneficial effect in my alloy. Preferably I use at least .5% to provide a desirable absorption cross-section and best results are achieved with from about .7% to about 2.6% gadolinium. Above about 3% gadolinium excessive difficulty may be encountered in forging the alloy although with gadolinium ranging from 2.6% to about 3% wrought articles may still be provided on a commercial scale without undue difficulty.

When my alloy was balanced so as to provide as-cast ingots containing less than about 4.5% ferrite, I found that it could not be hot worked on a commercial scale. That is to say, the ingot on being hot worked was found to rupture and tear to such a degree that sound forged billets could not be produced to any practical extent.

I found I could markedly improve the hot workability of my austenitic stainless steel alloy by balancing the alloy so that when cast as an ingot it contains from about 5% to 25% ferrite. By following this practice, the amount of scrap from defects resulting from hot working is readily kept within commercially tolerable limits. I preferably maintain the ferrite content in the range of about 10% to 15% particularly with the larger alloying additions.

Such elements as gadolinium, europium, samarium and dysprosium have a solid solubility in the austenitic phase that is low. It now appears that because of this, the gadolinium is present in a gadolinium rich phase which may also include chromium, nickel and iron. In ingots cast from the fully austenitic alloy, the gadolinium rich phase forms a continuous interdendritic membrane. I believe it is the membrane which rendered the fully austenitic stainless steel alloy containing gadolinium unforgeable for all practical purposes. Apparently, the 5% to 25% ferrite present in ingots cast from my alloy has the beneficial effect of breaking up the membrane and, while the gadolinium rich phase is still visible in micrographs of my alloy, it is no longer continuous.

Balancing my alloy so that the ingots cast therefrom contain from about 5% to 25% ferrite makes it possible to forge successfully ingots formed from my alloy. On the other hand, in conventional austenitic stainless steel alloys, as little as 5% ferrite in the as-cast ingots has an objectionable effect upon their hot workability. The difficulties experienced in hot working such alloys increase with increasing ferrite content, usually less than 25% ferrite renders the ingots hot short and forgeable, if at all, only with extreme difficulty.

My alloy may be prepared using conventional techniques for making stainless steel alloys. However, the high reactivity of such elements as gadolinium, or europium, samarium and dysprosium must be taken into account. In preparing the following examples of my alloy, gadolinium was added last and only after the melt had been carefully deoxidized and completely degassed. Following degassing of the melt, an inert atmosphere made up of argon or helium, about 10 to 15 inches of mercury, was provided over the melt and then the gadolinium was added. Gadolinium may be added in any convenient solid form such as a well compacted rod and immediately after the addition of the gadolinium the heat should be tapped.

The following examples are illustrative of my invention:

| Ex. No. | C | Mn | Si | Cr | Ni | Gd | Percent Ferrite |
|---|---|---|---|---|---|---|---|
| 1 | .011 | 1.25 | .28 | 18.26 | 10.16 | .76 | 10 |
| 2 | .030 | 1.69 | .41 | 18.86 | 10.22 | .85 | 12 |
| 3 | .011 | 1.31 | .33 | 18.74 | 10.40 | 1.03 | 12 |

In Examples 1–3 the balance was iron except for incidental impurities.

The alloy of Example 1 was cast as a 7½ inch square ingot weighing about 350 pounds. This ingot was hammer forged to a 4½ inch square billet which, after preparation was hot rolled to 5 inches by 2¼ inches. This was again hot rolled to strip about 5 inches by .187 inch and then cold finished. The forging or hot working was successfully carried out from a furnace temperature of about 1875° F.

The alloys of Examples 2 and 3 were forged as was pointed out in connection with Example 1 except that here 7 inch ingots each weighing about 520 pounds were cast. These ingots were forged to 6½ inch by 2 inch billets which in turn were hot rolled to 7 inch by .187 inch strip followed by cold finishing.

In contrast to Examples 1–3, an alloy was prepared containing .038% carbon, 1.6% manganese, .75% silicon, 17.7% chromium, 12.8% nickel, .6% gadolinium with the remainder iron except for incidental impurities. An ingot weighing about 1500 pounds was formed of this alloy which was fully austenitic with a gadolinium rich phase forming an interdendritic continuous membrane. The ingot on being press forged developed large tears. The portion of the ingot which was not hot worked was found to have developed a network of fine cracks.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

I claim:

1. An austenitic stainless steel alloy comprising, in approximate percent by weight, up to .25% carbon, up to 10% manganese, up to 2% silicon, up to 1% of the group phosphorus, sulfur and selenium, 12% to 26% chromium, 3.5% to 22% nickel, up to 4% molybdenum, up to 4% copper, up to 4% aluminum, up to 1.25% titanium, up to 1.25% columbium, up to .7% nitrogen, from .2% to 3% of at least one element from the group consisting of gadolinium, europium, samarium and dysprosium with the combined total of the elements from said group not exceeding 3%, the remainder being substantially iron, and the elements being balanced so that an as-cast ingot of the alloy contains about 5% to 25% ferrite.

2. An austenitic stainless steel alloy comprising, in approximate percent by weight, up to .03% carbon, up to 1% manganese, up to 1% silicon, up to .01% phosphorus, up to .010% sulfur, from 17% to 19% chromium, from 7% to 12% nickel, up to 4% molybdenum, up to 4% copper, up to 4% aluminum, up to 1.25% titanium, up to 1.25% columbium, up to .7% nitrogen, from .5% to 2.6% of at least one element from the group consisting of gadolinium, europium, samarium and dysprosium with the combined total of the elements from said group not exceeding 2.6%, the remainder being substantially iron, and the elements being balanced so that an as-cast ingot of the alloy contains about 10% to 15% ferrite.

3. An austenitic stainless steel alloy comprising, in approximate percent by weight, up to .25% carbon, up to 10% manganese, up to 2% silicon, up to 1% of the group phosphorus, sulfur and selenium, 12% to 26% chromium, 3.5% to 22% nickel, up to 4% molybdenum, up to 4% copper, up to 4% aluminum, up to 1.25% titanium, up to 1.25% columbium, up to .7% nitrogen, from .2% to 3% gadolinium, the remainder being substantially iron, and the elements being balanced so that an as-cast ingot of the alloy contains about 5% to 25% ferrite.

4. An austenitic stainless steel alloy comprising, in approximate percent by weight, up to .03% carbon, up to 1% manganese, up to 1% silicon, up to .010% phosphorus, up to .010% sulfur, from 17% to 19% chromium, from 7% to 12% nickel, up to 4% molybdenum, up to 4% copper, up to 4% aluminum, up to 1.25% titanium, up to 1.25% columbium, up to .7% nitrogen, from .2% to 3% gadolinium, the remainder being substantially iron, and the elements being balanced so that an as-cast ingot of the alloy contains about 10% to 15% ferrite.

5. An austenitic stainless steel alloy comprising, in approximate percent by weight, up to .03% carbon, up to 1% manganese, up to 1% silicon, up to .010% phosphorus, up to .010% sulfur, from 17% to 19% chromium, from 7% to 12% nickel, up to 4% molybdenum, up to 4% copper, up to 4% aluminum, up to 1.25% titanium, up to 1.25% columbium, up to .7% nitrogen, from .7% to 2.6% gadolinium, the remainder being substantially iron, and the elements being balanced so that an as-cast ingot of the alloy contains about 10% to 15% ferrite.

6. A wrought stainless steel article forged from an ingot comprising, in approximate percent by weight, up to .25% carbon, up to 10% manganese, up to 2% silicon, up to 1% of the group phosphorus, sulfur and selenium, 12% to 26% chromium, 3.5% to 22% nickel, up to 4% molybdenum, up to 4% copper, up to 4% aluminum, up to 1.25% titanium, up to 1.25% columbium, up to .7% nitrogen, from .2% to 3% of at least one element from the group consisting of gadolinium, europium, samarium and dysprosium with the combined total of the elements from said group not exceeding 3%, the remainder being substantially iron, and said ingot containing about 5% to 25% ferrite.

7. A wrought stainless steel article forged from an ingot comprising, in approximate percent by weight, up to .03% carbon, up to 1% manganese, up to 1% silicon, up to .010% phosphorus, up to .010% sulfur, from 17% to 19% chromium, from 7% to 12% nickel, up to 4% molybdenum, up to 4% copper, up to 4% aluminum, up to 1.25% titanium, up to 1.25% columbium, up to .7% nitrogen, from .5% to 2.6% of at least one element from the group consisting of gadolinium, europium, samarium and dysprosium with a combined total of the elements from said group not exceeding 2.6%, the remainder being substantially iron, and said ingot containing about 10% to 15% ferrite.

8. A wrought stainless steel article forged from an ingot comprising, in approximate percent by weight, up to .25% carbon, up to 10% manganese, up to 2% silicon, up to 1% of the group phosphorus, sulfur and selenium, 12% to 26% chromium, 3.5% to 22% nickel, up to 4% molydenum, up to 4% copper, up to 4% aluminum, up to 1.25% titanium, up to 1.25% columbium, up to .7% nitrogen, from .2% to 3% gadolinium, the remainder being substantially iron, and said ingot containing about 5% to 25% ferrite.

9. A wrought stainless steel article forged from an ingot comprising, in approximate percent by weight, up to .03% carbon, up to 1% manganese, up to 1% silicon, up to .010% phosphorus, up to .010% sulfur, from 17% to 19% chromium, from 7% to 12% nickel, up to 4% molybdenum, up to 4% copper, up to 4% aluminum, up to 1.25% titanium, up to 1.25% columbium, up to .7% nitrogen, from .2% to 3% gadolinium, the remainder being substantially iron, and said ingot containing about 10% to 15% ferrite.

10. A wrought stainless steel article forged from an ingot comprising, in approximate percent by weight, up to .03% carbon, up to 1% manganese, up to 1% silicon, up to .010% phosphorus, up to .010% sulfur, from 17% to 19% chromium, from 7% to 12% nickel, up to 4% molybdenum, up to 4% copper, up to 4% aluminum, up to 1.25% titanium, up to 1.25% columbium, up to .7% nitrogen, from .7% to 2.6% gadolinium, the remainder being substantially iron, and said ingot containing from 10% to 15% ferrite.

References Cited
UNITED STATES PATENTS

| | | | |
|---|---|---|---|
| Re. 24,243 | 12/1956 | Lohr. | |
| 2,104,836 | 1/1938 | Hassenbruch | 75—171 |
| 2,190,486 | 2/1940 | Schafmeister | 75—128 |
| 2,643,949 | 6/1953 | Tisdale | 75—128 X |
| 2,683,663 | 7/1954 | Tisdale | 75—128 |
| 3,168,397 | 2/1965 | Scharfstein | 75—128 |
| 3,189,445 | 6/1965 | Calkins | 75—170 |
| 3,189,446 | 6/1965 | Calkins | 75—171 |
| 3,245,782 | 4/1966 | Ray. | |

OTHER REFERENCES

Solubility Limits of Yttrium and the Lanthanide Rare-Earth Elements in Chromium and Chromium-Iron Alloys, Epstein et al., 1959, Batelle Memorial Institute Report No. BMI–1376.

HYLAND BIZOT, *Primary Examiner.*

P. WEINSTEIN, *Assistant Examiner.*